(12) United States Patent
Feller

(10) Patent No.: US 7,841,243 B1
(45) Date of Patent: Nov. 30, 2010

(54) SPEED OF SOUND AND PIPE SIZE DETECTOR

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/691,643

(22) Filed: Jan. 21, 2010

Related U.S. Application Data

(63) Continuation-in-part of application No. 12/650,347, filed on Dec. 30, 2009, which is a continuation-in-part of application No. 12/626,890, filed on Nov. 28, 2009.

(51) Int. Cl.
*G01F 1/66* (2006.01)
(52) U.S. Cl. .................................................. 73/861.27
(58) Field of Classification Search .. 73/861.25–861.29
See application file for complete search history.

(56) References Cited

U.S. PATENT DOCUMENTS 6,584,860 B1   7/2003   Feldman
6,973,842 B1 * 12/2005 Feller ...................... 73/861.27
7,093,502 B2 *  8/2006 Kupnik et al. ............ 73/861.29
7,201,065 B1 *  4/2007 Feller ...................... 73/861.27

\* cited by examiner

*Primary Examiner*—Jewel Thompson
(74) *Attorney, Agent, or Firm*—David Kiewit

(57) ABSTRACT

An ultrasonic transit time approach is used for measuring both a speed of sound of a fluid and a diameter of a pipe through which the fluid flows. A reflecting structure is provided to split an acoustic beam generated by a transducer into two portions. One of these portions traverses an acoustic path of known length in order to determine the speed of sound in the fluid. The second portion of the beam may be directed along a path that includes reflections from an inner surface of the pipe. In this case the second portion of the beam can be used to measure the diameter of the pipe. Alternately, the second portion of the beam may extend to a second transducer that is spaced apart along the pipe from the transducer generating the split beam.

9 Claims, 3 Drawing Sheets

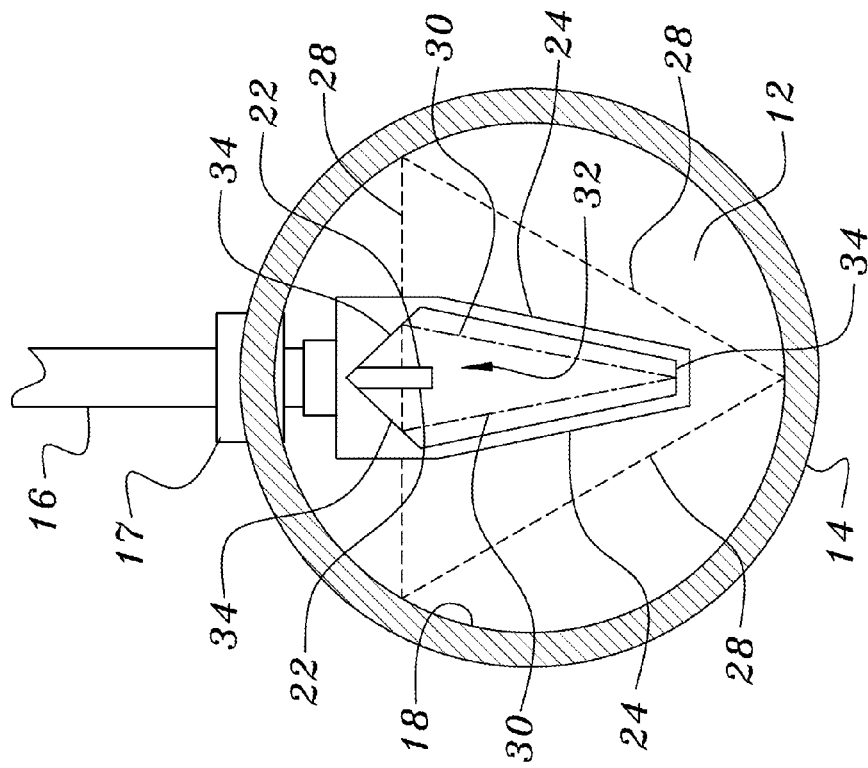
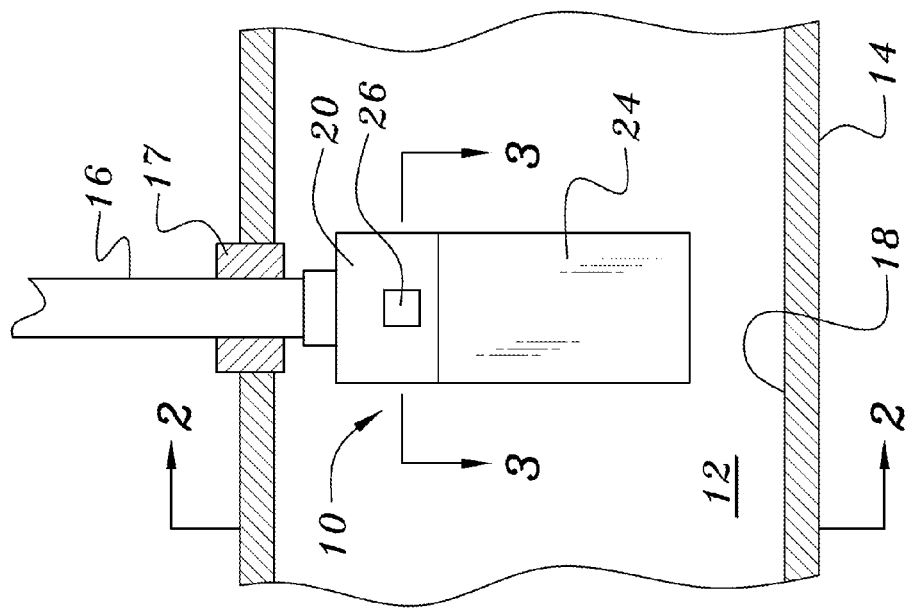
FIG. 1
FIG. 2

SPEED OF SOUND AND PIPE SIZE DETECTOR

BACKGROUND OF THE INVENTION

1. Field of the Invention

This application is a continuation-in-part of the inventor's U.S. Ser. No. 12/650,347, filed on Dec. 30, 2009, which is a continuation in part of the inventor's U.S. Ser. No. 12/626,890, Nov. 28, 2009. As such, it relates to method and apparatus for determining fluid flow rates by measuring the transit times of acoustic pulses transmitted through a flowing fluid.

2. Background Information

The accuracy of a transit-time flow measurement can be limited by the accuracy with which the speed of sound of the flowing fluid is known when that speed is used to determine the spacing between the rate measuring transducers. Moreover, a further accuracy limitation is imposed by the accuracy with which the inside diameter of the pipe is known.

In Ser. No. 12/650,347 the inventor describes transit time arrangements for measuring both the speed of sound of the fluid and the internal diameter of the pipe.

In U.S. Pat. No. 6,973,842 the inventor describes an acoustic transit time probe in which one or more transducers on a probe are used for measuring pipe diameter.

In U.S. Pat. No. 6,584,860 Feldman et al. teach approaches to determining the depth to which a probe is inserted into a pipe. In one of these approaches a first portion of an acoustic beam is incident on a reflector portion of a flow measurement path and a second portion of the beam reflects off an internal wall of the pipe to determine insertion depth.

BRIEF SUMMARY OF THE INVENTION

One aspect of the invention is that it provides an ultrasonic transit time apparatus for measuring both a speed of sound of a fluid and a diameter of a pipe through which the fluid flows. A preferred embodiment of this apparatus comprises an insertion probe rotatable about its axis and inserted to a selected insertion depth. A preferred probe has a single ultrasonic transducer assembly comprising parallel, spaced apart acoustic windows and a hollow probe head housing open to the flowing fluid. When the fluid is present the transducer assembly can simultaneously transmit acoustic signals from each window. A preferred hollow probe head housing has an acoustically reflective inner surface shaped so that a first portion of the acoustic signal transmitted from one of the windows reflects multiple times from the inner surface of the housing before being incident on the second of the windows after having traversed a selected distance. Because the length of the signal path traversed by the first portion of the acoustic signal is known, one can then determine the speed of sound in the fluid. The housing further comprises two apertures, each of which is parallel to and spaced apart from a respective one of the transducer windows so that a second portion of the acoustic signal transmitted from the one of the windows passes through the associated aperture and reflects off the internal surface of the pipe multiple times before being incident on the other of the two transducer windows. Because the speed of sound has been determined, measuring the transit time of the second portion of the acoustic signal allows one to determine the diameter of the pipe.

An advantage of the apparatus discussed above is that the cost and complexity of a probe can be reduced, and performance improved, by using a single transducer assembly to measure either or both of the speed of sound and the diameter of a pipe in which the probe is installed. Both of the active surfaces of the preferred transducer assembly are used to make the measurements, thereby reducing measurement uncertainties which occur when a plurality of transducers are used Another aspect of the invention is that it provides a transit time method of measuring both a speed of sound in a fluid flowing in a pipe and a diameter of the pipe. The apparatus used to carry out this method comprises a probe having at least one ultrasonic transducer disposed on it and a plurality of reflectors defining, with the at least one transducer, a return leg having a selected length. When the transducer is operated it generates an acoustic beam in the fluid. A first portion of that beam is intercepted, by one of the plurality of reflectors and traverses the return leg. Because the length of the return leg is known, one can determine the speed of sound from the associated transit time. Determining the diameter of the pipe involves rotating the probe about its axis that the acoustic beam propagates perpendicular to the axis of the pipe and setting the associated transducer at an insertion depth selected to define a diameter measuring path comprising a plurality of reflections from the inside surface of the pipe. Measuring the transit time for a second portion of the acoustic beam to traverse the diameter measuring path allows one to combine that measurement with the previously determined speed of sound in order to determine the diameter of the pipe.

In carrying out this method, one may note a pronounced peak in received acoustic signal amplitude when the transducer depth in the pipe is such that the received signal accurately centers on the transducer. This happens when the beams are orthogonal to the pipe axis and at various depths associated with a corresponding number of pipe reflections. For example, if the transducer depth is 25% of the pipe's diameter the beams trace out an equilateral triangle.

Another aspect of the invention is that it provides an ultrasonic transit time method of measuring both a speed of sound in a fluid and a flow rate of the fluid in a pipe. This method involves providing two transducers spaced apart along the pipe so as to define a transit time flow rate measurement path extending between them and associating a return leg with one of the two transducers. This return leg is of a selected length and comprises at least one reflector adjacent the selected one of the transducers. The at least one reflector and the first transducer are arranged so that the first of the reflectors intercepts only a first portion of a first acoustic beam generated by the first transducer and does not intercept a second portion of that beam. Measuring a transit time of the first portion of the first acoustic beam along the return leg thus allows one to determine a value of the speed of sound. Measuring a difference between the transit times of the second portion of the first acoustic beam and a second acoustic beam generated by the second transducer thus allows one to determine the flow rate of the fluid in the pipe by combining the value of the speed of sound, the difference between the transit times and the length of the transit time flow rate measurement path.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 1 is a simplified cut-away side view of a flow probe comprising reflective structures of the invention, the flow probe installed in a pipe.

FIG. 2 is a partly schematic end view of the probe of FIG. 1, the section through the pipe indicated by the arrow 2-2 in FIG. 1.

DETAILED DESCRIPTION OF A PREFERRED EMBODIMENT

Figure 3:
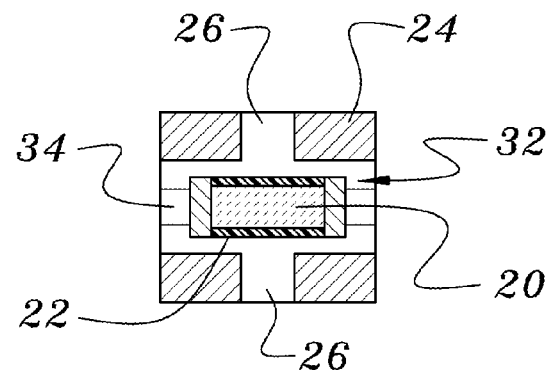
FIG. 3 is a partly schematic sectional view of the probe of FIG. 1, the section taken as indicated by the arrow 3-3 in FIG. 1

FIGS. 1-3 depict a preferred embodiment of an insertion probe 10 having a stem 16 inserted through a fitting (schematically indicated as 17) into a pipe 14 in which a fluid 12 is present. This probe 10 can be used for measuring both the speed of sound of the fluid 12 and an internal diameter of the pipe 14. The reader will note that in some applications, only one of those measurements may be needed and in others, additional measurement provisions may be added to determine flow rate, temperature etc.

A preferred probe 10 comprises a single transducer assembly 32 mounted in a hollow or skeletal housing 24 that is open to the flowing fluid and that can be oriented so as to provide a minimum flow impedance compatible with providing an acoustic path comprising multiple reflections from an acoustically reflecting internal surface 34 of the housing 24.

The single transducer assembly 32 can be operated to simultaneously transmit acoustic pulses from each of its two parallel windows 22. Because the windows 22 are chosen to be larger than respective adjacent apertures 26, a first portion of each pulse is intercepted by an internal surface 34 of the housing and the balance of the pulse passes through the aperture 26 so that it can reflect from an internal surface 18 of the pipe 14. When the probe 10 is aligned so that the transducer assembly 32 projects acoustic pulses in a plane perpendicular to an axis of the pipe 14 and the probe insertion depth is properly selected, multiple reflections from the internal surface 18 of the pipe 14 result in some of the acoustic energy emanating from one window being incident on the other.

Thus, the preferred probe can be used to define two acoustic beams for different measurement purposes. One of these beams 30 (depicted in single-dotted phantom) is a return leg beam that experiences multiple (e.g., three) reflections off an internal surface 34 of the housing 24. Here, the term 'return leg' is used to denote an acoustic beam of known length having both its ends on a single transducer assembly or probe. A return beam is distinct from any axial beam extending between probes. A return leg of this sort provides an acoustic path 30 of known length so that measuring a transit time along the beam 30 determines the speed of sound in whatever fluid 12 is present.

The second acoustic beam 28 (depicted in dashed phantom in FIG. 2) provides a diameter measuring path involving three reflections from an internal surface 18 of the pipe 14 and having a triangular shape. Establishing this path requires proper selection of the insertion depth and angular rotational setting of the probe head. A detailed discussion of a similar arrangement for making this measurement is fully described in the inventor's U.S. Pat. No. 6,973,842, the disclosure of which is incorporated herein by reference.

Figures 4A, 4B:
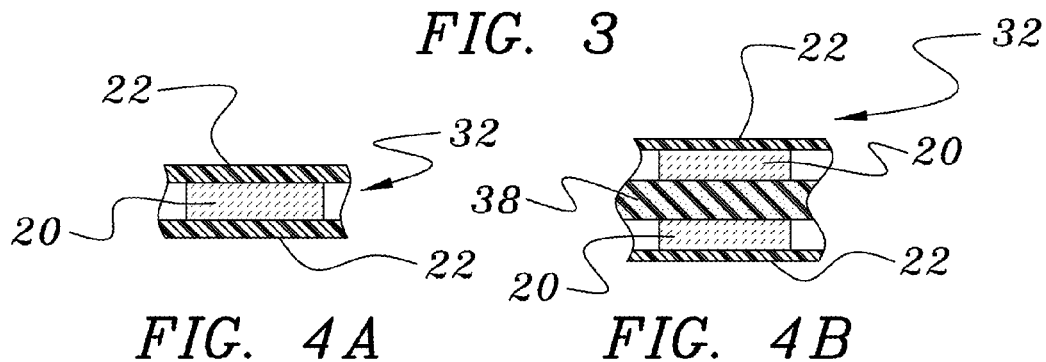
FIGS. 4A and 4B are schematic cross-sectional depictions of transducer arrangements.

A preferred transducer assembly 32 for use in the hollow housing 24 comprises a flat piezoelectric transducer 20 having two acoustic windows 22 attached to it, as depicted in FIG. 4A. One such embodiment used a single lead zirconate titanate (PTZ) piezoelectric element that was 0.300" wide× 0.200" high and 0.020" thick. This element was operated at its resonant frequency of 4 MHz and both of its active surfaces were used to transmit and receive the acoustic signal. It may be noted that in this arrangement the acoustic coupling to a fluid is typically improved, and the signal level is higher than if both surfaces had not been utilized.

When the diameter of the pipe is measured with the flowing fluid having a rotating component, the transit times for the two signals generated from the two faces of the transducer assembly and propagating around the diameter measuring path 28 will not be the same. If the transit times are large enough to differ by ½ or other half integral multiples (1½, 2½, 3½ etc.) of the acoustic wavelength the acoustic signals will arrive at the transducer in phase opposition and, if balanced in magnitude, will null each other so that little or no net signal is detected. Should this problem be experienced, it can be resolved by changing the fluid flow rate or the transducer frequency so that nulling is not complete and a usable signal level remains for diameter detection.

In an alternate embodiment, depicted in FIG. 4B, two transducers are separated by a block of acoustical isolation foam 38. This arrangement, while more complex than the preferred one, allows for independent operation of the two transducers, which can avoid the problem associated with rotating flow components.

Figure 5:
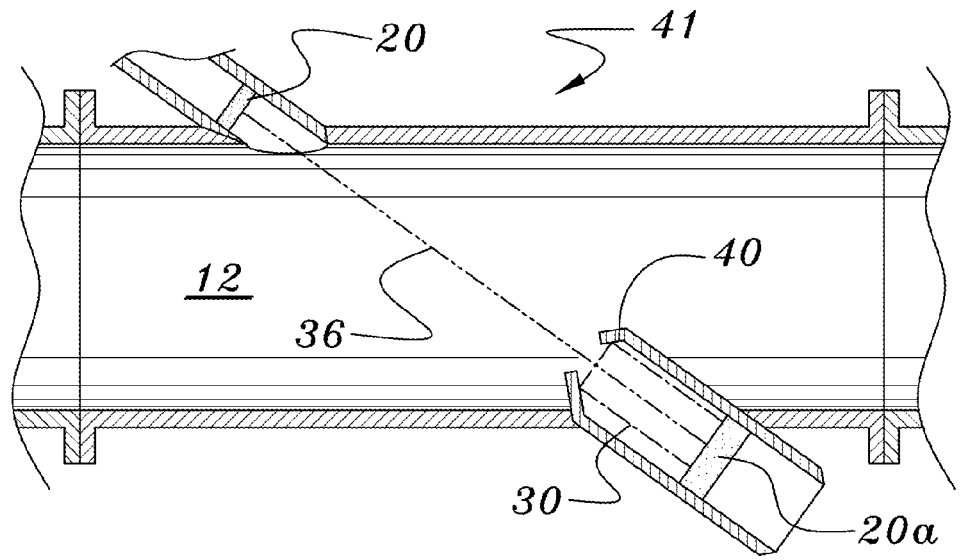
FIG. 5 is a schematic cross-sectional view of a full bore flowmeter comprising beam-splitting reflectors.
Figure 6:
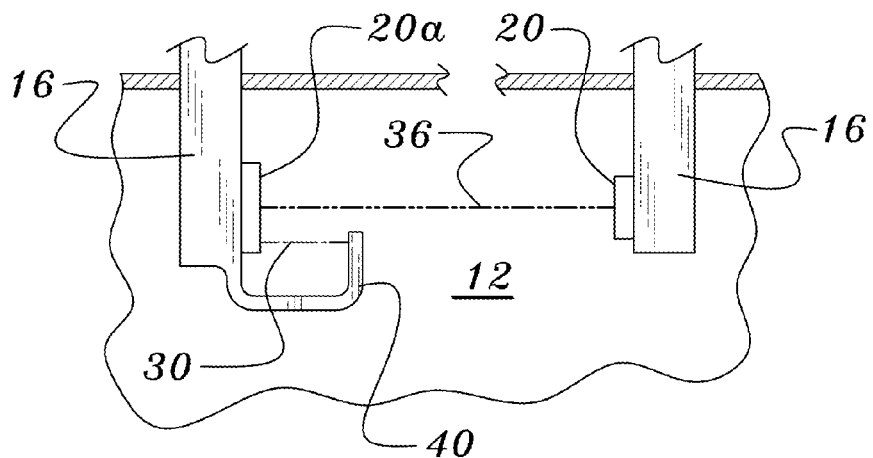
FIG. 6 is a schematic side view depicting a pair of spaced-apart probes, one of which comprises a reflector portion.

Turning now to FIGS. 5 and 6, one find schematic depictions of transit-time flow meters in which one or more reflectors 40 are added to a transducer 20a that is one of two used to make a transit time flow rate measurement. In these configurations the acoustic beam generated by the transducer 20a is split into a flow-measuring beam 36 and a return leg beam 30 used to determine the speed of sound in the fluid 12, as discussed above. These arrangements do not provide for a measurement of diameter. In the full-bore configuration depicted in FIG. 5, this is expected to be of little consequence because the diameter in the flow metering section 41 can be precisely determined during manufacture.

Figure 7:
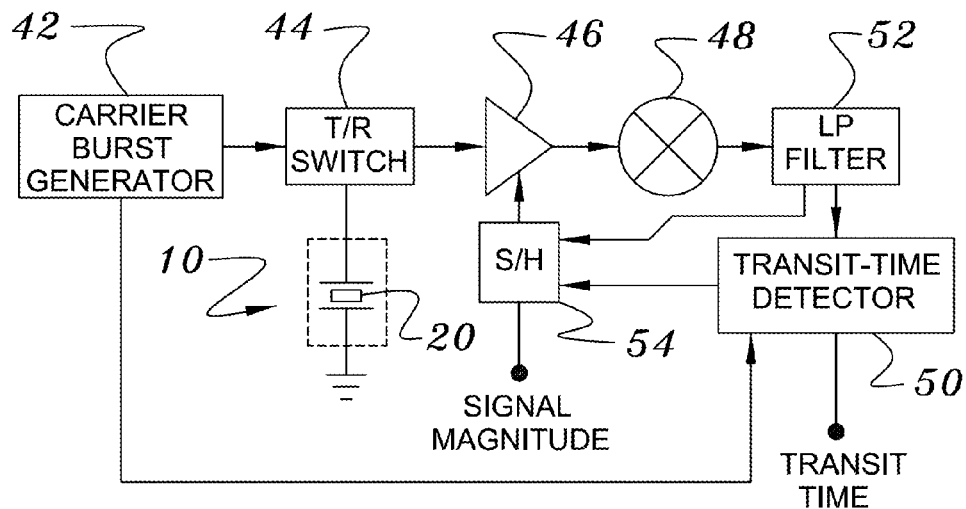
FIG. 7 is a simplified block diagram of supporting electronics for the operation of speed of sound and pipe diameter measurement sensor.

Turning now to FIG. 7, one finds a depiction of the major functional blocks supporting the probe's operation. In this example, a carrier burst generator 42 provides a signal through the transmit/receive (T/R) switch 44 to the transducer 20 in the probe 10. The T/R switch 44 disconnects the transmitter from the transducer when the transmitting burst is not present so that the received signal can be routed uninhibited to a signal amplifier 46. The amplified signal is then amplitude detected by a detector 48 and has its carrier components removed by a low pass filter 52 prior to being input to a transit-time detector 50. A sample and hold 54 detects the magnitude of the desired received signal during a selected time window for use by installation personnel in adjusting the probe's depth and angle for maximum received pipe diameter signal. The detector signal may also be used inversely to control the gain of the signal amplifier (i.e., automatic gain control) in a negative feedback loop so that a relatively constant magnitude signal is supplied to the detector 48.

In this circuit the transit-time detector 50 measures the time between the beginning of the transmitted carrier burst and the received signals. Because the acoustic path distance used for the speed of sound measurement is much less than that for the diameter measurement, the received signals for both can be easily identified. Enable time windows can be incorporated into that detector to allow it to respond to signals occurring only within a certain time frame corresponding to the desired measurement. For example, if the transit time for a four inch return leg is nominally seventy microseconds, an enable window located between sixty five and seventy five microseconds could be used. If the transit time for the three-reflection pipe diameter measurement is nominally 140 microseconds, an enable window located between 130 and 150 microseconds could be used, which would correspond to an approximate eight inch path length in a water-filled three inch Schedule 40 pipe. With a single transmitted burst, both measurements could be made and recorded independently or alternatively, they could be made on a time shared basis.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A transit time method of measuring both a speed of sound in a fluid flowing in a pipe and a diameter of the pipe, the method comprising the steps of:
    providing a probe having at least one ultrasonic transducer disposed thereon, the at least one transducer generating an acoustic beam in the fluid;
    providing a plurality of reflectors defining, with the at least one transducer, a return leg having a selected length;
    intercepting, by one of the plurality of reflectors, a first portion of the acoustic beam;
    measuring a time required for the first portion of the acoustic beam to traverse the return leg and determining therefrom the speed of sound;
    rotating the probe about an axis thereof so that the acoustic beam propagates perpendicular to the axis of the pipe;
    setting the at least one transducer at an insertion depth selected to define a diameter measuring path comprising a plurality of reflections from the inside surface of the pipe; and
    measuring a time required for a second portion of the acoustic beam to traverse the diameter measuring path and determining therefrom the diameter of the pipe.

2. The method of claim 1 wherein the probe comprises a hollow probe head open to the fluid and wherein the first portion of the acoustic beam is reflected from an internal surface of the hollow probe head more than once.

3. The method of claim 1 wherein the diameter measuring path is longer than the return leg.

4. The method of claim 1 wherein exactly one ultrasonic transducer generates and receives the acoustic beam and wherein the measuring steps are carried out by time-enabling circuitry.

5. An ultrasonic transit time method of measuring both a speed of sound in a fluid and a flow rate of the fluid in a pipe, the method comprising the steps of:
    providing two transducers spaced apart by a first selected acoustic path length along the pipe, the two transducers disposed so as to define a transit time flow rate measurement path extending between them;
    providing at least one reflector adjacent a first of the transducers, the at least one reflector and the first transducer disposed so as to define a return leg having a second selected acoustic path length, the at least one reflector disposed so as to intercept only a first portion of a first acoustic beam generated by the first transducer and to not intercept a second portion of the first acoustic beam,
    operating the first and second transducers to generate respective first and second acoustic beams;
    measuring a return leg transit time of the first portion of the first acoustic beam and thereby determining a value of the speed of sound;
    measuring a difference between the transit times of the second portion of the first acoustic beam and the second acoustic beam;
    combining the value of the speed of sound, the difference between the transit times and the first selected acoustic path length to determine the flow rate of the fluid in the pipe.

6. The method of claim 5 wherein each of the two transducers spaced apart by the first selected acoustic path length is mounted on a respective probe.

7. An ultrasonic transit time apparatus for measuring both a speed of sound of a fluid and a diameter of a pipe through which the fluid flows, the apparatus comprising:
    a single ultrasonic transducer assembly comprising parallel, spaced apart acoustic windows, the transducer assembly operable, when the fluid is present, to simultaneously transmit acoustic signals from each window, the transducer assembly disposed on a probe head rotatable about an axis thereof and insertable into the pipe to a selected insertion depth;
    a hollow probe head housing open to the flowing fluid, the probe head housing comprising:
    an acoustically reflective inner surface having a shape selected so that a first portion of an acoustic signal transmitted from one of the windows reflects multiple times from the inner surface of the housing before being incident on the second of the windows after having traversed a selected distance; and
    two apertures, each of which is parallel to and spaced apart from a respective one of the transducer windows so that a second portion of the acoustic signal transmitted from the one of the windows passes through the associated aperture;
    whereby when the probe is inserted to the selected insertion depth and rotated about its axis to generate the acoustic signal in a plane perpendicular to the axis of the pipe, the transducer assembly and the second portion of the signal define a diameter measuring acoustic path comprising a plurality of reflections from an internal surface of the pipe.

8. The apparatus of claim 7 wherein the single ultrasonic transducer assembly comprises a single piezoelectric element having two parallel faces, each of which is associated with a respective one of the windows.

9. The apparatus of claim 7 wherein the single ultrasonic transducer assembly comprises two piezoelectric elements spaced apart by an acoustic isolator, each of the piezoelectric elements associated with a respective one of the windows.

* * * * *